Aug. 11, 1970 H. FLEISSNER ET AL 3,523,434
APPARATUS FOR THE TREATMENT OF LOOSE AND ENDLESS
FIBRES OR FILAMENT-LIKE MATERIALS
Filed July 8, 1969
2 Sheets-Sheet 1

Inventors:
HEINZ FLEISSNER and GEROLD FLEISSNER
BY Craig, Antonelli, Stewart & Hill
ATTORNEYS Inventors:
HEINZ FLEISSNER and GEROLD FLEISSNER 3,523,434
APPARATUS FOR THE TREATMENT OF LOOSE AND ENDLESS FIBRES OR FILAMENT-LIKE MATERIALS
Heinz Fleissner and Gerold Fleissner, Frankfurt am Main, Germany, assignors to VEPA AG, Frankfurt am Main, Germany
Continuation-in-part of application Ser. No. 655,549, July 24, 1967. This application July 8, 1969, Ser. No. 839,960
Claims priority, application Germany, July 10, 1968, 1,760,851
Int. Cl. F26b 25/00
U.S. Cl. 68—5     11 Claims

ABSTRACT OF THE DISCLOSURE

The present disclosure is directed to an apparatus for the treatment of materials which comprises a treatment chamber, a conveying means rotatively disposed within the treatment chamber, said treatment chamber being provided with an inlet and outlet therefor, said inlet and/or outlet having associated therewith a means for producing a flowing liquid curtain across said inlet and/or outlet for substantially hermetically sealing the treatment chamber from the atmosphere.

BACKGROUND OF THE DISCLOSURE

The present invention is a continuation-in-part application of application Ser. No. 655,549, filed July 24, 1967.

The present invention relates to an apparatus for the treatment, for example, for shrinking, dyeing, bleaching, heat-setting, washing, finishing, etc., of loose and endless fibres and filament-like materials which are exposed to at least one treatment medium, such as steaming, drying, washing and the like. The material to be treated is conveyed as a plurality of filaments arranged side by side on a suitable conveying means through the treatment apparatus.

The conveying element used in the apparatus of the present invention usually consists of a steam-permeable conveyor belt, preferably a metal wire mesh belt which extends out of the treatment chamber at the inlet and at the outlet of the apparatus. Both ends of the conveyor belt are advantageously connected to form an endless belt. According to prior devices, a good sealing of the inlet and/or outlet of the apparatus may be effected by means of a washer seal. However, in such devices the conveyor belt is subjected to considerable stress and wear since it is necessary to pass the conveyor belt entering or leaving the treatment chamber together with the material disposed thereon over a deflector roll and through a bowl. Moreover, a squeezing which occurs between the deflector roll and the conveyor belt is not desirable when treating many types of textile materials.

SUMMARY OF THE INVENTION

An object of the present invention is to avoid the prior art disadvantages in the treatment of textile materials.

Another object of the present invention is to provide an improved apparatus for the sealing of the inlet and/or outlet of a treatment chamber.

Other objects and further scope of the applicability of the present invention will become apparent from the detailed description given hereinafter:

It should be understood, however, that the detailed description has specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved device for sealing the inlet and/or outlet of a treatment chamber may be obtained by closing said inlet and/or outlet of the treatment chamber with a curtain of liquid, preferably water, which flows in the downward direction across said inlet and/or said outlet in a closed front. According to the present invention, this curtain renders it possible to pass the conveying element smoothly and in a flat plane out of the treatment chamber of the apparatus. According to the present invention, a careful treatment of the conveying element is insured if a slide strap is arranged beneath the conveyor belt in such a manner that the liquid curtain is directed onto the middle portion of said slide strap. If the conveyor belt is a water-permeable wire mesh belt, the curtain of liquid forms a film between the slide strap and the conveyor belt, said film being continuously renewed. This film has the effect of lubricating the conveyor belt and thus protect it.

When compared with conventional sealing means. especially compared with a water seal, the liquid curtain, according to the present invention, offers the decisive advantage that the treatment chamber of the apparatus is accessible during operation without affecting the sealing effect of the curtain. Thus, for occasional corrections, such as for making regulating changes in the interior of the machine, the curtain may be penetrated by means of suitable poles without difficulty. The liquid curtain automatically closes around the pole and beneath the point where said pole penetrates the liquid curtain. It is readily possible to provide pole-like operating elements extending into the treatment chamber for continuous working, and/or to equip the device with such operating elements.

For producing the curtain according to the present invention, it is desirable to provide above the inlet and/or outlet of the treatment chamber a container to which, during the operation of the device, liquid is continuously supplied. This container is equipped with an overflow edge, and the liquid flowing over said edge forms a curtain of liquid which is collected by another container disposed below said inlet and/or outlet. In order to obtain a liquid surface with as little turbulence as possible, the liquid container disposed above the inlet and/or outlet is advantageously provided with a supply container which is separated from the liquid container by means of an overflow strap or a perforated partition and into which the liquid supply is conveyed. To further equalize the liquid level one or several vertical straps may be immersed into the liquid. These straps may also serve as upper sealing elements for the treatment chamber of the apparatus. According to the present invention, the liquid curtain may be used with any type of treatment device. Another advantage of the sealing means of the present invention is that the liquid curtain may be used to replace undesirable sealing means, such as for example water seals.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
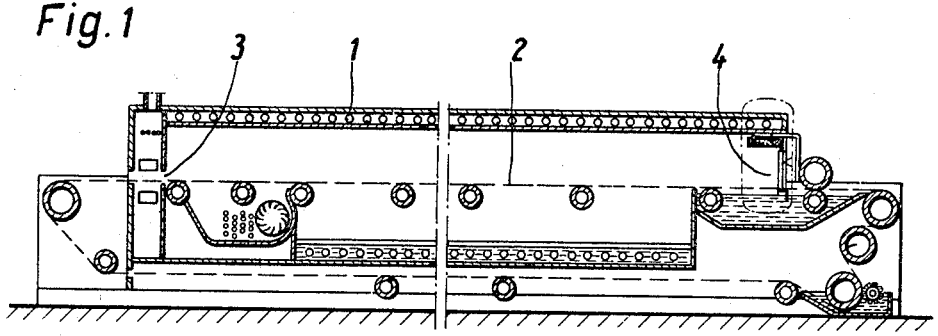
FIG. 1 is a longitudinal section of the apparatus of the present invention wherein the liquid curtain is arranged at the outlet of the treatment chamber on the right-hand side.
Figure 2:
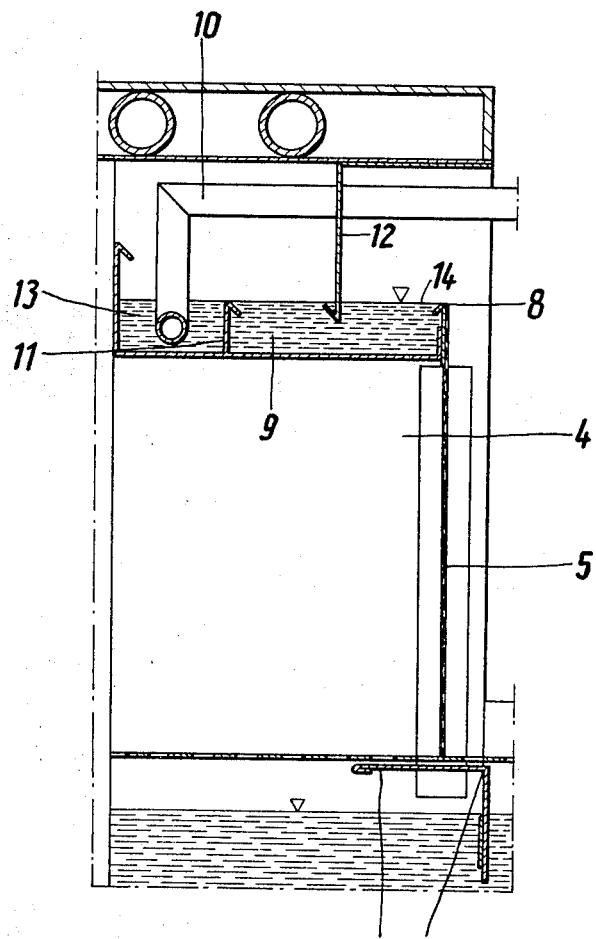
FIG. 2 is an enlarged detailed drawing of the curtain according to the present invention and as used in FIG. 1.

Referring now to the drawing, wherein like reference numerals are used throughout the various views to designate like parts, the apparatus according to FIG. 1 comprises a treatment chamber 1 through which a conveying element 2 in the form of an endless belt is passed. The conveying element 2 transports the material to be treated in the form of wide lengths continuously through the treatment chamber 1 of the apparatus. The conveyor belt 2 enters the treatment chamber 1 through an inlet 3 and leaves through an outlet 4. In accordance with the present invention, it is desired to avoid the equalization of the atmosphere in the treatment chamber with the atmosphere outside of the treatment chamber through outlet 4. Thus, it is desired to maintain the atmosphere inside of the treatment chamber slightly higher than that on the outside of the treatment chamber so that the flow of gas and/or vapors in the treatment chamber is in the direction toward the outside of said chamber. According to the present invention and particularly with respect to FIG. 2, a curtain 5 in the form of a liquid, preferably water, flows in a downward direction in a closed front at the outlet of the treatment chamber, thereby providing said outlet with a hermetical seal. As shown in FIG. 2, the conveyor belt 2 leaves the treatment chamber 1 over the edge 6. The conveyor belt 2 slides over a strap 7 which is directed inwardly. Vertically above the strap 7, preferably above its center, an upper edge or overflow edge 8 of the outlet 4 of the treatment chamber 1 is situated. During operation of the apparatus and for forming the curtain 5, a suitable liquid, preferably water, flows continuously over the edge 8 out of a container 9. This curtain seals the outlet 4 hermetically, and moreover, it offers the advantage that after its passage through the material to be processed and through the conveyor belt 2 a liquid film is formed on the strap 7 by the impact of the liquid curtain on said strap, said liquid film protecting the conveyor belt 2 sliding thereover because of its lubricating quality. Beneath the strap 7 the liquid which forms the curtain is collected and pumped back into the container 9 by a suitable pipe means. In order to achieve the formation of a curtain 5 according to the present invention, as soon as the device is started up, it must be made sure that the container 9 is filled up to its upper edge with a suitable liquid while the device is at a standstill. The container 9 is furthermore provided with a supply container 13 from which the liquid passes into the container 9 over the strap 11. This provides the advantage that the liquid may flow over edge 8 undisturbed when forming the closed curtain 5. To further equalize the liquid level, a strap 12 may be used which immerses vertically into the liquid. This strap 12 may moreover serve as an upper sealing element for the treatment chamber 1.

Figure 3:
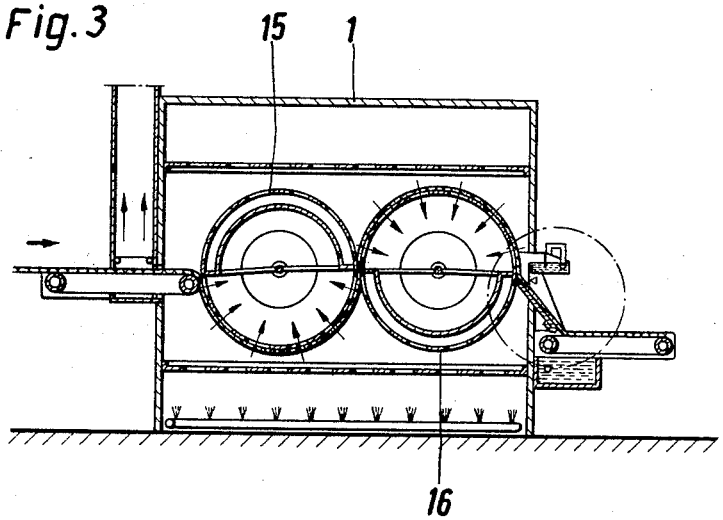
FIG. 3 is a longitudinal section of the use of the liquid curtain in another treatment device, said liquid curtain also being arranged at the outlet of the treatment chamber on the right-hand side.
Figure 4:
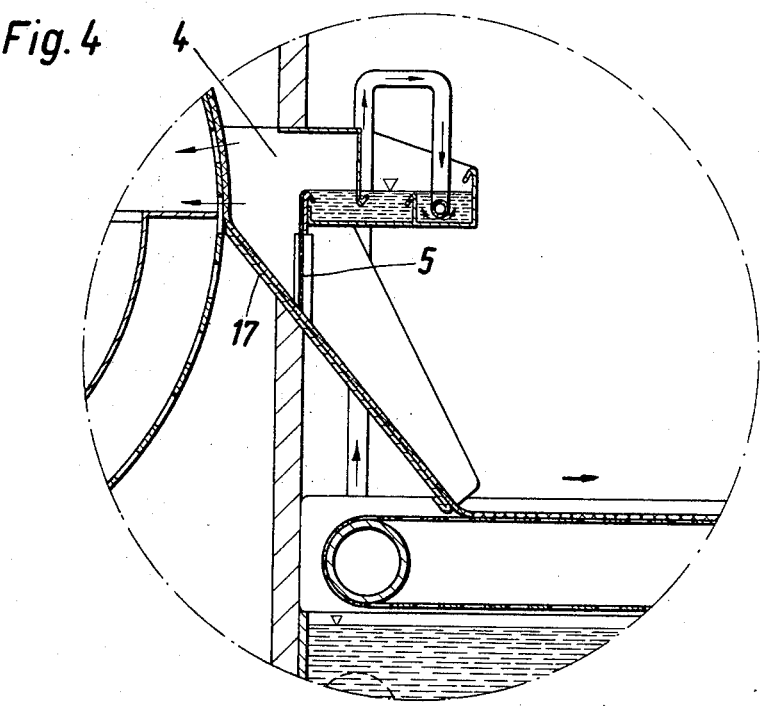
FIG. 4 is an enlarged detailed drawing of the curtain as shown in FIG. 3.

According to FIGS. 3 and 4, the curtain 5 according to the present invention is used at the right-hand outlet of the treatment chamber 1 of a device in which two suction rollers 15 and 16 are used as the conveying means. The material to be treated leaves the treatment chamber 1 over the discharge sheet 17. The curtain 5, which as shown in FIG. 4 is formed in a slightly different way than that of FIG. 1, serves for sealing the outlet 4. However, it is formed with the same means as shown in the upper portion of FIG. 2.

In many cases the liquid curtain may simultaneously serve as a pre-washing unit. In these cases it is necessary to continuously renew a certain portion of the circulated liquid. Apart from fiber and filament-like materials, also hank-like materials and material lengths and as well as knitted goods and bulk goods may be processed continuously in the apparatus of the present invention.

The invention being thus described, it will be obvious that the same may be varied in many ways. Such variations are not to be regarded as a departure from the spirit and scope of the invention, and all such modifications as will be apparent to one skilled in the art are intended to be included.

What is claimed is:

1. An apparatus for the treatment of materials which comprises a treatment chamber, a conveying means rotatably disposed within the treatment chamber, said treatment chamber being provided with an inlet and outlet therefor, said inlet and/or outlet having associated therewith a means for producing a flowing liquid curtain across said inlet and/or outlet for substantially hermetically sealing the treatment chamber from the atmosphere.

2. The apparatus of claim 1 wherein the means for producing a flowing liquid curtain comprises an upper and lower container means disposed above and below said inlet and/or outlet respectively, said container means containing a liquid, the upper container containing an overflow edge on one of its sides over which the liquid flows to the lower container and means associated with both the upper and lower container for recyling the liquid from the lower container to the upper container.

3. The apparatus of claim 2 wherein the outer edge of the lower container is provided with a strap which extends inward, said strap providing a smooth sliding surface for the conveying means.

4. The apparatus of claim 3 wherein the overflow edge of the upper container is disposed above the middle portion of the inwardly extending strap so that the liquid curtain falls on said strap forming a liquid film thereon which protects the conveying means sliding over said strap.

5. The apparatus of claim 4 wherein the conveying means is a perforated conveyor belt which leaves the treatment chamber over the edge of the lower container.

6. The apparatus of claim 2 wherein the upper container is divided by an overflow strap means into a supply container and a distributing container.

7. The apparatus of claim 6 wherein the recycle means communicates with the supply container.

8. The apparatus of claim 7 wherein a strap means vertically extends into the distributing chamber and the liquid disposed therein.

9. The apparatus of claim 1 wherein the conveying means are sieve drum means and a discharge sheet is provided at the outlet of the treatment chamber for removing the material being treated from said treatment chamber, said flowing liquid curtain substantially sealing the space above said discharge sheet.

10. The apparatus of claim 9 wherein the means for producing a flowing liquid curtain comprises an upper container disposed above the discharge sheet and a lower container disposed below the discharge sheet, said container means containing a liquid, the upper container containing an overflow edge on one of its sides over which the liquid flows to the lower container, and means associated with both the upper and lower containers for recycling the liquid from the lower container to the upper container.

11. The apparatus of claim 10 wherein the overflow edge of the discharge sheet communicates with a conveyor belt which is disposed above the lower container.

References Cited

UNITED STATES PATENTS 3,450,486   6/1969   Fleissner _____ 34—242 X

WILLIAM I. PRICE, Primary Examiner

U.S. Cl. X.R.

34—242